(12) United States Patent
Lin et al.

(10) Patent No.: US 10,104,040 B2
(45) Date of Patent: Oct. 16, 2018

(54) WIRELESS LOCAL AREA NETWORK WLAN USER ROAMING METHOD, APPARATUS, AND SYSTEM (71) Applicant: Huawei Technologies Co., Ltd., Shenzhen (CN)

(72) Inventors: Yunyun Lin, Beijing (CN); Ping Wu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 123 days.

(21) Appl. No.: 14/955,551

(22) Filed: Dec. 1, 2015

(65) Prior Publication Data

US 2016/0165506 A1 Jun. 9, 2016

(30) Foreign Application Priority Data

Dec. 1, 2014 (CN) .......................... 2014 1 0717923

(51) Int. Cl.
*H04W 36/14* (2009.01)
*H04L 29/12* (2006.01)
(Continued)

(52) U.S. Cl.
CPC ...... *H04L 61/6068* (2013.01); *H04L 12/1886* (2013.01); *H04L 12/4633* (2013.01);
(Continued)

(58) Field of Classification Search
None
See application file for complete search history.

(56) References Cited

U.S. PATENT DOCUMENTS 8,018,900 B2* 9/2011 Blanchette ............. H04L 45/66
370/331
8,687,609 B2* 4/2014 Gundavelli ............. H04L 12/18
370/331
(Continued)

FOREIGN PATENT DOCUMENTS

CN 102598602 A 7/2012

OTHER PUBLICATIONS

Korhonen, J., Ed., et al., "Runtime Local Mobility Anchor (LMA) Assignment Support for Proxy Mobile IPv6," RFC 6463, Feb. 2012, 22 pages.
(Continued)

*Primary Examiner* — Vinncelas Louis
(74) *Attorney, Agent, or Firm* — Conley Rose, P.C.

(57) ABSTRACT

A wireless local area network (WLAN) user roaming method, apparatus, and system. A foreign access point (FAP) associated after layer 3 roaming of a wireless terminal of the user receives a first packet; the FAP. The user obtains an encapsulation entry of a first roaming tunnel, where a tunnel outer destination IP address in the encapsulation entry of the first roaming tunnel is an Internet Protocol (IP) address of a home access point (HAP) before the roaming of the wireless terminal, and a tunnel outer source IP address in the encapsulation entry of the first roaming tunnel is an IP address of the FAP. The FAP encapsulates the first packet according to the encapsulation entry of the first roaming tunnel, and the FAP sends the encapsulated first packet to the HAP. The user establishes a tunnel between the APs can greatly shorten a forwarding path of the roaming tunnel user.

9 Claims, 5 Drawing Sheets (51) Int. Cl.
*H04L 12/46* (2006.01)
*H04L 12/18* (2006.01)
*H04W 36/00* (2009.01)
*H04W 36/22* (2009.01)
*H04W 84/12* (2009.01)
*H04W 88/16* (2009.01)

(52) U.S. Cl.
CPC ........ *H04W 36/0016* (2013.01); *H04W 36/22* (2013.01); *H04W 84/12* (2013.01); *H04W 88/16* (2013.01)

(56) References Cited

U.S. PATENT DOCUMENTS

| | | | |
|---|---|---|---|
| 2004/0053624 A1* | 3/2004 | Frank | H04L 47/14 455/453 |
| 2009/0034470 A1* | 2/2009 | Nagarajan | H04L 12/1886 370/331 |
| 2009/0109933 A1* | 4/2009 | Murasawa | H04L 63/029 370/335 |
| 2015/0201451 A1* | 7/2015 | Pazhyannur | H04W 76/041 370/338 |

OTHER PUBLICATIONS

Zhang, R., et al., "Alternate Tunnel Encapsulation for Data Frames in CAPWAP," draft-ieff-opsawg-capwap-alt-tunnel-04, Nov. 10, 2014, 13 pages.

Foreign Communication From a Counterpart Application, European Application No. 15196124.0, Extended European Search Report dated Apr. 26, 2016, 7 pages.

Foreign Communication From a Counterpart Application, Chinese Application No. 2014107179239, Chinese Search Report dated Jun. 25, 2018, 2 pages.

Foreign Communication From a Counterpart Application, Chinese Application No. 2014107179239, Chinese Search Report dated Jul. 4, 2018, 6 pages.

* cited by examiner

| Subscriber MAC address (entry index) | Current roaming status | Corresponding roaming tunnel ID | Other subscriber information |
|---|---|---|---|
| XXXX-XXXX-XXXX | Layer3 Roam In (cross-gateway roam-in) | 1 | ...... |
| ...... | | | |

FIG. 3

| Roaming tunnel ID (entry index) | Peer IP address (IP address of an HAP) | Peer UDP port number (UDP port number of the HAP) | Other encapsulation information |
|---|---|---|---|
| 1 | x.x.x.x | 5247 | ...... |
| ...... | | | |

FIG. 4

| Subscriber MAC address (entry index) | Current roaming status | Corresponding roaming tunnel ID | Other subscriber information |
|---|---|---|---|
| XXXX-XXXX-XXXX | Layer3 Roam Out (cross-gateway roam-out) | 2 | ...... |
| ...... | | | |

FIG. 5

| Roaming tunnel ID (entry index) | Peer IP address (IP address of an FAP) | Peer UDP port number (UDP port number of the FAP) | Other encapsulation information |
|---|---|---|---|
| 2 | y.y.y.y | 5247 | ...... |
| ...... | | | |

WIRELESS LOCAL AREA NETWORK WLAN USER ROAMING METHOD, APPARATUS, AND SYSTEM

CROSS-REFERENCE TO RELATED APPLICATION

This application claims priority to Chinese Patent Application No. 201410717923.9, filed on Dec. 1, 2014, which is hereby incorporated by reference in its entirety.

TECHNICAL FIELD

The application relates to the field of communications technologies, and in particular, to a wireless local area network user roaming method, apparatus, and system.

BACKGROUND

With the gradual maturity of a wireless local area network (WLAN) technology, in a typical scenario of enterprise campus networks, it has become a trend to provide a WLAN wireless access function. The WLAN starts to be deployed in more and more campus networks, for example, enterprise offices, indoor/outdoor stadiums and gymnasiums, conference halls/theaters/exhibition halls, and classrooms/training centers, to provide users with wireless network access experience characterized by low costs, ultra-wideband, and stability and convenience anytime and anywhere.

Compared with wired access, one important advantage of the WLAN is that the WLAN supports mobility of users. It is an important subject of the WLAN to ensure smooth service experience during a roaming process of a user. Roaming refers to a case in which a service remains uninterrupted when a wireless terminal moves between access points (AP). When APs associated with the wireless terminal before and after the roaming of the wireless terminal join different service virtual local area networks (VLAN), the roaming is called layer 3 roaming. Generally, devices joining a same service VLAN indicate the devices belonging to a same gateway device. Therefore, the layer 3 roaming is generally also called cross-gateway roaming. In a scenario of the layer 3 roaming, to ensure that a service of a user remains uninterrupted, both an Internet Protocol (IP) address carried in a packet sent by the user and service VLAN information added by an AP cannot change, that is, the service VLAN information added by the AP associated before the roaming and the allocated IP address remain unchanged. However, the user already roams to a foreign network in which an AP joining a different service VLAN is located; therefore, the packet cannot be forwarded by a gateway device of the foreign network. In a conventional solution, a forwarding path is long, forwarding efficiency is low, and a user service interruption time during the roaming process is long. Therefore, how to better implement the layer 3 roaming is an urgent issue to be addressed.

SUMMARY

To better implement layer 3 roaming, embodiments of the present disclosure provide a WLAN user roaming method, apparatus, and system.

According to a first aspect, a WLAN user roaming method is provided, including: receiving, by a foreign AP (FAP) associated after layer 3 roaming of a wireless terminal of a user, a first packet sent by the wireless terminal; searching, by the FAP according to the first packet, a pre-created user table to obtain an encapsulation entry of a first roaming tunnel on which the first packet is to be forwarded, where a tunnel outer destination IP address in the encapsulation entry of the first roaming tunnel is an IP address of a home AP (HAP) before the roaming of the wireless terminal, and a tunnel outer source IP address in the encapsulation entry of the first roaming tunnel is an IP address of the FAP; encapsulating, by the FAP, the first packet according to the encapsulation entry of the first roaming tunnel; and sending, by the FAP, the encapsulated first packet to the HAP using the first roaming tunnel.

With reference to the first aspect, in a first possible implementation manner, before the searching, by the FAP according to the first packet, a pre-created user table, the method further includes: receiving, by the FAP, first user roaming information sent by a foreign access controller (FAC) to which the FAP belongs, where the first user roaming information includes user information about the user, information that the user is a layer 3 roaming user, and IP address information about the HAP; and adding, by the FAP, the encapsulation entry of the first roaming tunnel to the user table according to the first user roaming information.

With reference to the first aspect or the first possible implementation manner of the first aspect, in a second possible implementation manner, the HAP is an AP selected by a first access controller (AC1) from an AP resource group, where the AC1 is an access controller (AC) to which a first access point (AP1) associated before the roaming of the wireless terminal belongs, and the AP resource group consists of APs that belong to a same gateway device as the AP1.

With reference to the first aspect, or the first possible implementation manner of the first aspect, or the second possible implementation manner of the first aspect, in a third possible implementation manner, the method further includes receiving, by the FAP using a second roaming tunnel, a second packet forwarded from the HAP to the wireless terminal, where the second packet is a packet that is received by the HAP from a network side and sent by the HAP to the wireless terminal, a tunnel outer destination IP address in an encapsulation entry of the second roaming tunnel is the IP address of the FAP, and a tunnel outer source IP address in the encapsulation entry of the second roaming tunnel is the IP address of the HAP.

According to a second aspect, an AP is provided, where the AP is a FAP associated after layer 3 roaming of a wireless terminal of a user, the AP including: a receiving unit configured to receive a first packet sent by the wireless terminal; a processing unit configured to search, according to the first packet, for a pre-created user table to obtain an encapsulation entry of a first roaming tunnel on which the first packet is to be forwarded, where a tunnel outer destination IP address in the encapsulation entry of the first roaming tunnel is an IP address of a HAP before the roaming of the wireless terminal, and a tunnel outer source IP address in the encapsulation entry of the first roaming tunnel is an IP address of the FAP; and encapsulate the first packet according to the encapsulation entry of the first roaming tunnel; and a sending unit configured to send the encapsulated first packet to the HAP using the first roaming tunnel.

With reference to the second aspect, in a first possible implementation manner, the receiving unit is further configured to receive first user roaming information sent by a FAC to which the FAP belongs, where the first user roaming information includes user information about the user, information that the user is a layer 3 roaming user, and IP address information about the HAP; and the processing unit is further configured to add the encapsulation entry of the first roaming tunnel to the user table according to the first user roaming information.

With reference to the second aspect or the first possible implementation manner of the second aspect, in a second possible implementation manner, the HAP is an AP selected by a AC1 from an AP resource group, where the AC1 is an AC to which a AP1 associated before the roaming of the wireless terminal belongs, and the AP resource group consists of APs that belong to a same gateway device as the AP1.

With reference to the second aspect, the first possible implementation manner of the second aspect, or the second possible implementation manner of the second aspect, in a third possible implementation manner, the receiving unit is further configured to receive, using a second roaming tunnel, a second packet forwarded from the HAP to the wireless terminal, where the second packet is a packet that is received by the HAP from a network side and sent by the HAP to the wireless terminal, a tunnel outer destination IP address in an encapsulation entry of the second roaming tunnel is the IP address of the FAP, and a tunnel outer source IP address in the encapsulation entry of the second roaming tunnel is the IP address of the HAP.

According to a third aspect, an AP is provided, where the AP is a HAP associated before layer 3 roaming of a wireless terminal of a user, the access point including a receiving unit configured to receive, using a first roaming tunnel, a first packet sent by a FAP associated after the layer 3 roaming of the wireless terminal, where a tunnel outer destination IP address in an encapsulation entry of the first roaming tunnel is an IP address of the HAP, and a tunnel outer source IP address in the encapsulation entry of the first roaming tunnel is an IP address of the FAP; a processing unit configured to remove tunnel encapsulation from the first packet; and a sending unit configured to send the first packet from which the tunnel encapsulation is removed to a gateway device to which the HAP belongs.

With reference to the third aspect, in a first possible implementation manner, the HAP is an AP selected by a AC1 from an AP resource group, where the AC1 is an AC to which a AP1 associated before the roaming of the wireless terminal belongs, and the AP resource group consists of APs that belong to a same gateway device as the AP1.

With reference to the third aspect or the first possible implementation manner of the third aspect, in a second possible implementation manner, the receiving unit is further configured to receive, from a network side, a second packet sent to the wireless terminal; the processing unit is further configured to encapsulate the second packet according to an encapsulation entry of a second roaming tunnel, where a tunnel outer destination IP address in the encapsulation entry of the second roaming tunnel is the IP address of the FAP, and a tunnel outer source IP address in the encapsulation entry of the second roaming tunnel is the IP address of the HAP; and the sending unit is further configured to send the encapsulated second packet to the FAP using the second roaming tunnel.

With reference to the third aspect, the first possible implementation manner of the third aspect, or the second possible implementation manner of the third aspect, in a third possible implementation manner, the receiving unit is further configured to receive second user roaming information sent by the AC1 to which the HAP belongs, where the second user roaming information includes user information about the user, information that the user is a layer 3 roaming user, and IP address information about the FAP; and the processing unit is further configured to create, according to the second user roaming information, a second user forwarding entry and the encapsulation entry of the second roaming tunnel corresponding to the second user forwarding entry.

According to a fourth aspect, an AC is provided, where the AC is a AC1 to which a AP1 associated before layer 3 roaming of a wireless terminal of a user belongs, the access controller including a receiving unit configured to receive a notification message sent by a FAC to which a FAP associated after the layer 3 roaming of the wireless terminal belongs, where the notification message carries information that the user is a layer 3 roaming user; and a selection unit configured to, after the receiving unit receives the notification message, select an AP from an AP resource group as a HAP of the wireless terminal, where the AP resource group consists of APs that belong to a same gateway device as the AP1.

With reference to the fourth aspect, in a first possible implementation manner, the selection unit is specifically configured to dynamically select, according to the load balancing principle, an AP with minimum load as the HAP of the wireless terminal.

According to a fifth aspect, a WLAN user roaming system is provided, including the above-described two APs, and the above-described two ACs.

According to the WLAN user roaming method, apparatus, and system provided by the embodiments of the present disclosure, a FAP associated after layer 3 roaming of a wireless terminal of a user receives a first packet sent by the wireless terminal; the FAP encapsulates the first packet according to a pre-created encapsulation entry of a first roaming tunnel, where a tunnel outer destination IP address in the encapsulation entry of the first roaming tunnel is an IP address of a HAP before the roaming of the wireless terminal, and a tunnel outer source IP address in the encapsulation entry of the first roaming tunnel is an IP address of the FAP; and the FAP sends the encapsulated first packet to the HAP using the first roaming tunnel. In most campus network scenarios, since a user can roam between APs, a distance between these APs is generally not excessively long; therefore, directly establishing a tunnel between the APs can greatly shorten a forwarding path of the roaming tunnel, which is obviously beneficial to the improvement of the forwarding efficiency and shortens an establishing time of the roaming tunnel, thereby shortening a user service interruption time during the roaming process.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The following describes the embodiments of the present disclosure in further detail with reference to the accompanying drawings in this specification.

Figure 1:
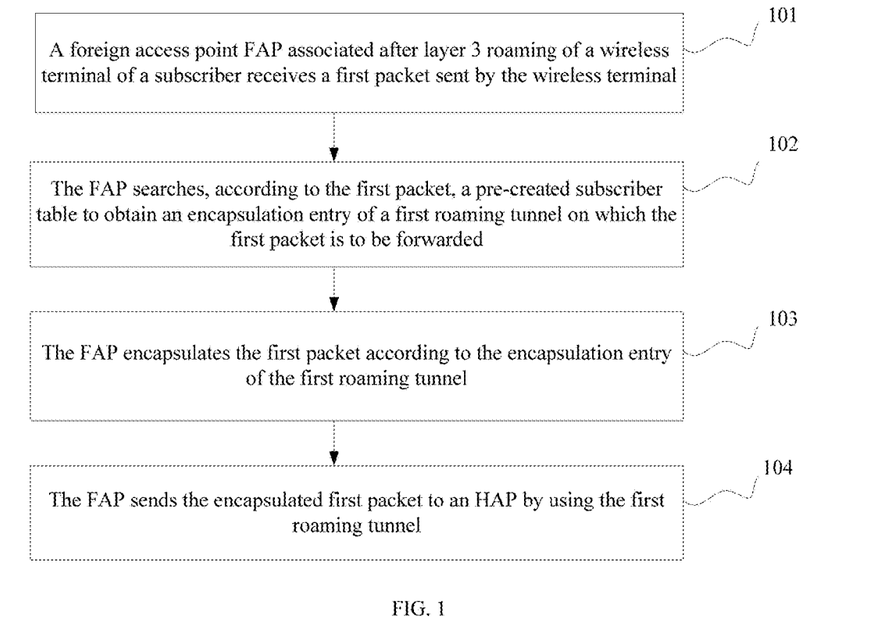
FIG. 1 is a schematic diagram of a WLAN user roaming method according to an embodiment of the present disclosure.

As shown in FIG. 1, an embodiment of the present disclosure provides a WLAN user roaming method, including:

S101: A FAP associated with a wireless terminal of the user after layer 3 roaming of the wireless terminal of the user receives a first packet sent by the wireless terminal.

S102: The FAP searches, according to the first packet, a pre-created user table to obtain an encapsulation entry of a first roaming tunnel on which the first packet is to be forwarded, where a tunnel outer destination IP address in the encapsulation entry of the first roaming tunnel is an IP address of a HAP of the wireless terminal before the roaming of the wireless terminal, and a tunnel outer source IP address in the encapsulation entry of the first roaming tunnel is an IP address of the FAP.

S103: The FAP encapsulates the first packet according to the encapsulation entry of the first roaming tunnel.

S104: The FAP sends the encapsulated first packet to the HAP using the first roaming tunnel.

According to the WLAN user roaming method provided by this embodiment of the present disclosure, in most campus network scenarios, since a user can roam between APs, a distance between these APs is generally not excessively long; therefore, directly establishing a tunnel between the APs can greatly shorten a forwarding path of the roaming tunnel, which is obviously beneficial to the improvement of the forwarding efficiency and shortens an establishing time of the roaming tunnel, thereby shortening a user service interruption time during the roaming process.

Optionally, before the FAP searches the pre-created user table according to the first packet, the method further includes: receiving, by the FAP, first user roaming information sent by a FAC to which the FAP belongs, where the first user roaming information includes user information about the user, information that the user is a layer 3 roaming user, and IP address information about the HAP; and adding, by the FAP, the encapsulation entry of the first roaming tunnel to the user table according to the first user roaming information.

Optionally, the HAP is an AP selected by an AC1 from an AP resource group, where the AC1 is an AC to which an AP1 associated before the roaming of the wireless terminal belongs, and the AP resource group consists of APs that belong to a same gateway device as the AP1.

Optionally, the method further includes receiving, by the FAP using a second roaming tunnel, a second packet forwarded from the HAP to the wireless terminal, where the second packet is a packet that is received by the HAP from a network side and sent by the HAP to the wireless terminal, a tunnel outer destination IP address in an encapsulation entry of the second roaming tunnel is the IP address of the FAP, and a tunnel outer source IP address in the encapsulation entry of the second roaming tunnel is the IP address of the HAP.

Figure 2:
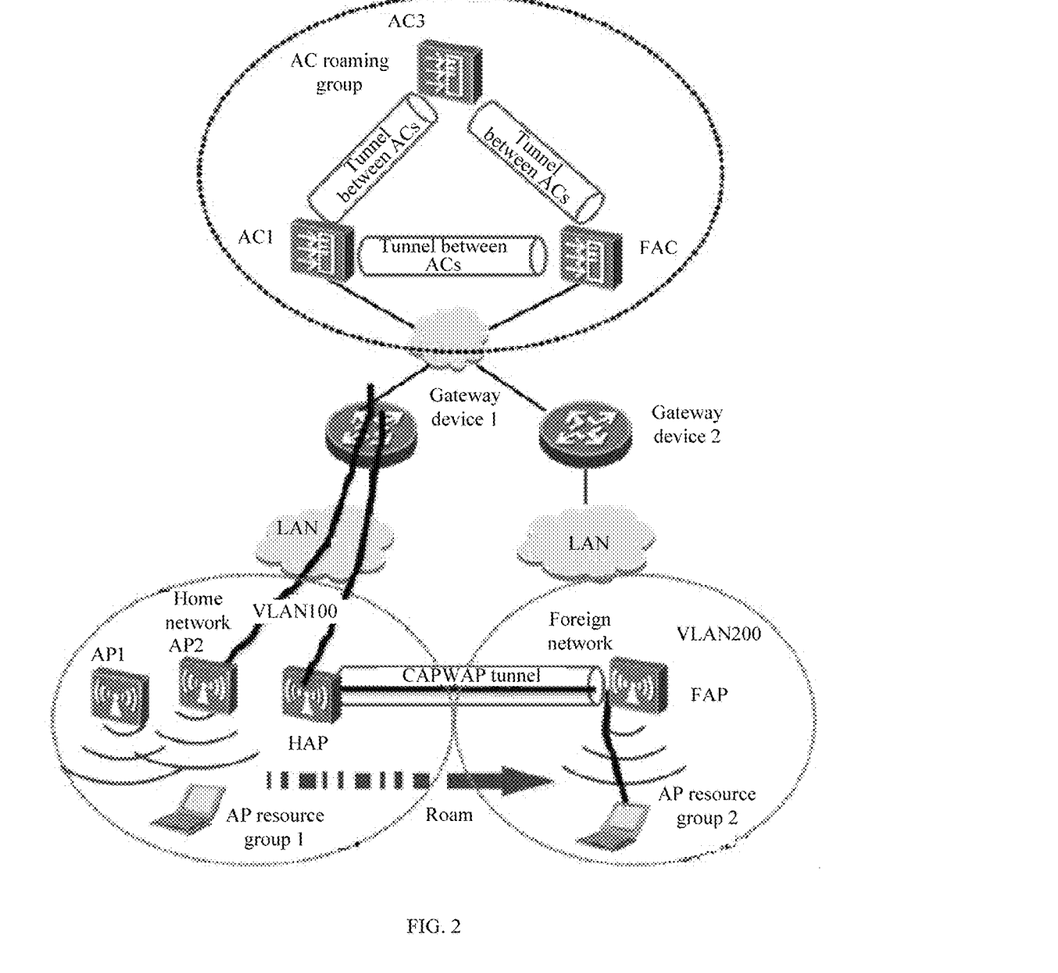
FIG. 2 is a schematic diagram of an application scenario according to an embodiment of the present disclosure.

As shown in FIG. 2, an application scenario of an embodiment of the present disclosure is described in detail.

First, a wireless terminal of a user roams from an AP1, associated before the roaming, in a home network to a FAP, newly associated, in a foreign network, where the AP1 joins a service VLAN 100, and the FAP joins a service VLAN 200.

Second, a FAC to which the FAP belongs identifies that the user is a layer 3 roaming user using some rules, for example, it is detected that the service VLANs joined by the FAP and the AP1 are different.

The roaming in this embodiment of the present disclosure may be roaming under a same AC or roaming in an AC roaming group. The AC roaming group refers to a case in which a group of ACs is specified, and ACs that belong to the same group may mutually synchronize, using a tunnel between the ACs, user information (such as a user name of the user, and media access control (MAC) address information of the wireless terminal of the user) and information (such as information about the service VLAN joined by the AP, and information about the IP address allocated to the AP) about the AP accessed by the user, to support roaming. This group is called the roaming group. Generally, in a roaming group, one AC may be selected as a primary AC to perform configuration on all other ACs.

Third, the FAC synchronizes user information from an AC1 to which the AP1 belongs (if the user roams only in one AC, the FAC and the AC1 are a same device, and the synchronization of the user information is not involved; and this step can be ignored).

The user information may include information such as a user name and a MAC address of the wireless terminal of the user.

Forth, the FAC sends a notification message to the AC1, where the notification message includes information that the user is a layer 3 roaming user, and the notification message may further include IP address information about the FAP.

Fifth, the AC1 dynamically selects, according to the load balancing principle from an AP resource group that the AP1 is in, an AP with minimum load as a HAP of the roaming user, and returns information such as an IP address of the HAP to the FAC.

In this embodiment of the present disclosure, the APs that belong to a same gateway device may be grouped into one AP resource group, that is, APs in an AP resource group can implement layer 2 interworking with a same gateway device, and all APs in an AP resource group can send packets using the gateway device.

In a scenario of the layer 3 roaming, to ensure that a service of the user remains uninterrupted, both an IP address carried in a packet sent by the user and service VLAN information added by the AP cannot change, that is, the service VLAN information added by the AP associated before the roaming and the allocated IP address remain unchanged. However, the user already roams to a foreign network in which an AP joining a different service VLAN is located; therefore, the packet cannot be forwarded using a gateway device of the foreign network. Consequently, a device needs to be found in a home network to serve as a home agent of the user, so that traffic is forwarded to the home agent by means of a roaming tunnel, the home agent transfers the traffic to the gateway device, and the gateway device sends the traffic. In this embodiment of the present disclosure, the home agent may be dynamically allocated in the AP resource group, and the selected AP in this embodiment of the present disclosure is called a HAP.

The HAP is selected according to the load balancing principle. The AC1 selects, as the HAP of the wireless terminal, an AP with minimum load in the AP resource group that the AP1 is in.

The load here refers to a quantity of users on the AP, including a sum of a quantity of users currently associated and a quantity of roaming users using the AP as the home agent.

A specific algorithm of HAP selection is as follows:

The AC1 traverses all APs in the AP resource group, and selects an AP with a minimum total quantity of users as the HAP. A total quantity of users on each AP=a quantity of users currently associated with the AP+a quantity of users using the AP as the HAP. For the selected HAP, a count of the quantity of users is increased by 1.

The AC1 to which the HAP belongs is also called a Home Access Controller (HAC).

Sixth, the FAC sends first user roaming information to the FAP, where the first user roaming information includes user information about the user, information that the user is a layer 3 roaming user, and IP address information about the HAP.

Seventh, the FAP adds an encapsulation entry of a first roaming tunnel to a user table according to the first user roaming information.

In this embodiment of the present disclosure, the user table is created and saved in the FAP, where the user table may include a user forwarding table and a roaming tunnel encapsulation table corresponding to the user forwarding table. After receiving the first user roaming information, the FAP creates, according to the first user roaming information, a first user forwarding entry and an encapsulation entry of a first roaming tunnel corresponding to the first user forwarding entry, that is, the FAP adds the first user forwarding entry to the user forwarding table, and adds the encapsulation entry of the first roaming tunnel corresponding to the first user forwarding entry to the roaming tunnel encapsulation table.

Figure 3:
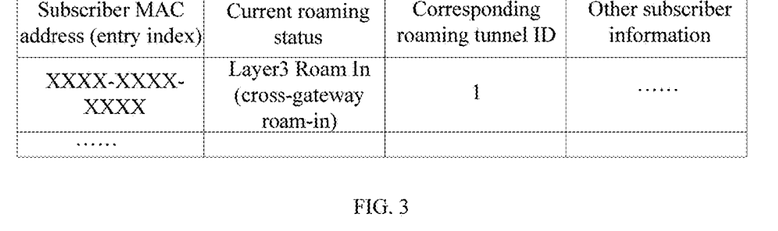
FIG. 3 is a schematic diagram of a first user forwarding entry according to an embodiment of the present disclosure.
Figure 4:
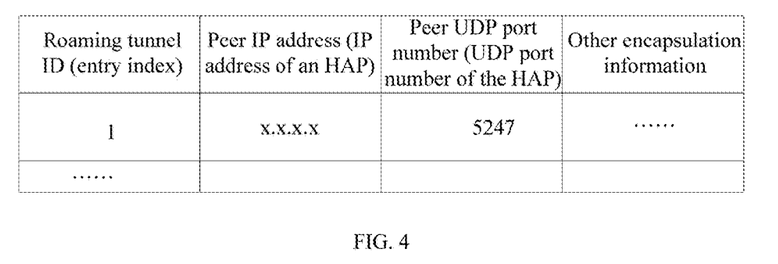
FIG. 4 is a schematic diagram of an encapsulation entry of a first roaming tunnel according to an embodiment of the present disclosure.

The user forwarding table and the first user forwarding entry in this embodiment of the present disclosure may be shown in FIG. 3, the roaming tunnel encapsulation table and the encapsulation entry of the first roaming tunnel may be shown in FIG. 4, the encapsulation may be Internet Engineering Task Force (IETF)-defined protocol standard that controlling and configuring an AP by an AC, i.e. Control And Provisioning of Wireless Access Points (CAPWAP), encapsulation, a tunnel outer destination IP address in the encapsulation entry of the first roaming tunnel is an IP address of the HAP, and a tunnel outer source IP address in the encapsulation entry of the first roaming tunnel is an IP address of the FAP.

The user forwarding table and the roaming tunnel encapsulation table in this embodiment of the present disclosure may also be combined into one user table, or encapsulation information of the first roaming tunnel may exist not in form of an entry. A specific form is not limited, and falls within the protection scope of the present disclosure.

Eighth, the AC1 sends second user roaming information to the selected HAP, where the second user roaming information includes user information about the user, information that the user is a layer 3 roaming user, and IP address information about the FAP.

Ninth, the HAP creates, according to the second user roaming information, a second user forwarding entry and an encapsulation entry of a second roaming tunnel corresponding to the second user forwarding entry.

Figure 5:
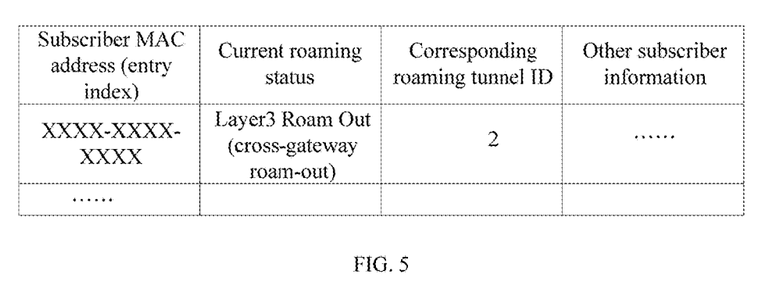
FIG. 5 is a schematic diagram of a second user forwarding entry according to an embodiment of the present disclosure.
Figure 6:
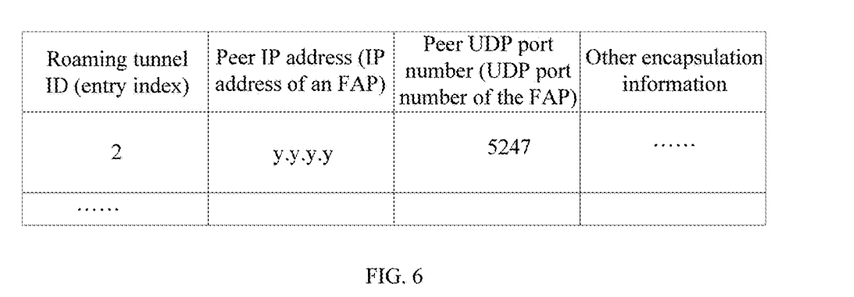
FIG. 6 is a schematic diagram of an encapsulation entry of a second roaming tunnel according to an embodiment of the present disclosure.

The user forwarding table and the second user forwarding entry in this embodiment of the present disclosure may be shown in FIG. 5, the roaming tunnel encapsulation table and the encapsulation entry of the second roaming tunnel may be shown in FIG. 6, the encapsulation may be CAPWAP encapsulation, a tunnel outer destination IP address in the encapsulation entry of the second roaming tunnel is the IP address of the FAP, and a tunnel outer source IP address in the encapsulation entry of the second roaming tunnel is the IP address of the HAP.

Tenth, traffic of the roaming user is transferred between the HAP and the FAP using the roaming tunnel.

In an uplink direction:

S101: The wireless terminal sends a first packet on an air interface, where a source IP address of the first packet is an IP address allocated to the AP1 before the roaming.

S102: After receiving the first packet, the FAP searches a user forwarding table, finds that the user is a layer 3 roaming user, finds the corresponding encapsulation entry of the first roaming tunnel in a roaming tunnel encapsulation table, encapsulates the first packet according to the encapsulation entry of the first roaming tunnel, and sends the encapsulated first packet to the HAP.

The FAP also adds service VLAN information to the first packet, where the service VLAN information includes the service VLAN 100 joined by the AP1 before the roaming.

S103: After receiving the first packet from the first roaming tunnel, the HAP removes tunnel encapsulation, and sends the first packet from which the tunnel encapsulation is removed to a gateway device to which the HAP belongs, and the gateway device sends the first packet.

In a downlink direction:

S104: The HAP receives, from a network side, a second packet sent to the wireless terminal of the user.

S105: The HAP queries the user forwarding table, finds that the user is a layer 3 roaming user, finds the corresponding encapsulation entry of the second roaming tunnel in the roaming tunnel encapsulation table, encapsulates the second packet according to the encapsulation entry of the second roaming tunnel, and sends the encapsulated second packet to the FAP.

S106: After receiving the second packet from the second roaming tunnel, the FAP removes tunnel encapsulation, and forwards the second packet from which the tunnel encapsulation is removed to the wireless terminal of the user.

A sequence of the foregoing S4 and S6 is not limited by this embodiment of the present disclosure, which falls within the protection scope of this embodiment of the present disclosure. A sequence of S6 and S8 is also not limited by this embodiment of the present disclosure, which falls within the protection scope of this embodiment of the present disclosure.

In one roaming process, the foregoing AC1 and FAC, as well as the HAP and FAP may be a same device physically, but may be grouped into multiple roles logically. The AC1 and FAC, as well as the HAP and FAP in this embodiment of the present disclosure mainly refer to logical roles, and whether the AC1 and FAC, as well as the HAP and FAP correspond to a same physical device is not differentiated.

Another application scenario in this embodiment of the present disclosure is that a user roams again after layer 3 roaming, but does not roam back to an original home network.

For example, the user roams from an AP1 in a home network to a second AP (AP2) in a foreign network, and then roams again to a third AP (AP3) that is not in the home network. In this case, the user is still in layer 3 roaming relative to a HAP. Therefore, a roaming tunnel is still needed to transfer traffic. However, a new HAP does not need to be selected. Only a start point of the roaming tunnel needs to be changed from AP2 to AP3.

A specific processing procedure is as follows:

S201: A wireless terminal of the user roams from an AP2 to an AP3, and the AP3 becomes a new FAP. An FAC to which the FAP belongs identifies that the user is a layer 3 roaming user (relative to an HAP) using some rules, for example, it is detected that service VLANs joined by the new FAP and the AP1 are different.

S202: The new FAC to which the new FAP (AP3) belongs synchronizes user information from an original FAC (an FAC to which the AP2 belongs) (if the user roams only in one AC, the new and original FACs are a same device, and the synchronization of the user information is not involved; and this step can be ignored).

The user information may include information such as a user name and a MAC address of the wireless terminal of the user. The user information may further include information such as an HAC and the HAP of the user.

S203: The new FAC sends a notification message to the original FAC, to inform the original FAC that the user roams to a new FAP.

S204: The original FAC deletes the user information. Since then, the user has had no association with the original FAP and FAC.

S205: The new FAC sends a notification message to the HAC (AC1), where the notification message includes information that the user is a layer 3 roaming user, and the notification message may further include IP address information about the new FAP.

S206: The new FAC sends third user roaming information to the new FAP, where the third user roaming information includes user information, information that the user is a layer 3 roaming user, and IP address information about the HAP.

S207: The new FAP creates, according to the third user roaming information, a third user forwarding entry and an encapsulation entry of a third roaming tunnel corresponding to the third user forwarding entry, where the encapsulation may be CAPWAP encapsulation, and a tunnel outer destination IP address in the encapsulation entry of the third roaming tunnel is an IP address of the HAP.

S208: The HAC (AC1) sends fourth user roaming information to the HAP, where the fourth user roaming information includes user information, information that the user is a layer 3 roaming user, and IP address information about the new FAP.

S209: The HAP creates, according to the fourth user roaming information, a fourth user forwarding entry and an encapsulation entry of a fourth roaming tunnel corresponding to the fourth user forwarding entry, where the encapsulation may be CAPWAP encapsulation, and a tunnel outer destination IP address in the encapsulation entry of the fourth roaming tunnel is an IP address of the new FAP.

S210: Traffic of the roaming user is transferred between the HAP and the new FAP using the third roaming tunnel or the fourth roaming tunnel.

Another application scenario in this embodiment of the present disclosure is that a user roams back to an original home network after layer 3 roaming.

For example, the user roams from an AP1 in the home network to an AP2 in a foreign network, and then roams again to an AP3 in the home network.

Because the user goes back to the original home network, traffic can be directly forwarded in the newly associated AP locally without being forwarded using a roaming tunnel. Therefore, the corresponding roaming tunnel is deleted.

A specific processing procedure is as follows:

S301: The user roams from an AP2 to an AP3, and the AP3 becomes a newly associated AP. An AC to which the AP3 belongs identifies, that the user is in layer 2 roaming (relative to the HAP) using some rules, for example, it is detected that service VLANs joined by the AP3 and the AP1 are the same.

S302: The AC to which the AP3 belongs synchronizes user information from an original FAC (an FAC to which the AP2 belongs) (if the user roams only in one AC, the new and original FACs are a same device, and the synchronization of the user information is not involved; and this step can be ignored).

The user information may include information such as a user name and a MAC address of a wireless terminal of the user. The user information may further include information such as an HAC and the HAP of the user.

S303: The AC to which the AP3 belongs sends a notification message to the original FAC, to inform the original FAC that the user roams to a new AP.

S304: The original FAC deletes the user information. Since then, the user has had no association with the original FAP and FAC.

S305: The AC to which the AP3 belongs informs an HAC (AC1) that the user roams to a new AP (AP3) by means of layer 2 roaming.

S306: The HAC deletes the user information. Since then, the user has had no association with the HAP and the HAC.

S307: The AC to which the AP3 belongs sends the user information to the new AP, and informs the new AP that the user is a layer 2 roaming user, and traffic is directly forwarded in the new AP locally. The new AP actually becomes a new HAP of the user.

Another application scenario in this embodiment of the present disclosure is that an HAP that serves as a home agent of a user is faulty after the user performs layer 3 roaming.

For example, the user roams from an AP1 in a home network to an AP2 in a foreign network, and selects an AP3 in the home network as a HAP of the user, but the AP3 is faulty in the network running process.

In this case, after detecting that the HAP is faulty, an HAC finds another AP (one or more) in an AP resource group that the HAP is in to replace the AP3 to serve as a new agent of the roaming user originally using the AP3 as the home agent, so that the service of the roaming user rapidly recovers.

A specific procedure is as follows:

S401: An HAC detects that an AP is faulty.

S402: The HAC finds entries of all layer 3 roaming users using the faulty AP as the HAP. If a quantity of the users is relatively small (for example, less than 10), the HAC finds, in an AP resource group that the faulty AP is in, an AP with minimum load currently to replace the HAP. If a quantity of the users is relatively large, the HAC finds, in a corresponding AP resource group, multiple APs with small load to jointly replace the HAP, where each AP is allocated with some roaming users served by the original HAP. The original roaming users use the corresponding replacing APs as respective new HAPs.

S403: The HAC sends user roaming information to each new HAP.

S404: The new HAP creates a user forwarding entry and a corresponding roaming tunnel CAPWAP encapsulation entry, where a tunnel outer destination IP address points to an IP address of an FAP of each user.

S405: The HAC informs a corresponding FAC of each user that the HAP of the user have been updated (if the user roams only in one AC, the FAC and the HAC are a same device, and the synchronization of the user information is not involved; and this step can be ignored).

S406: The FAC sends a notification message to the corresponding FAP of each user, and refreshes the corresponding roaming tunnel CAPWAP encapsulation entry, where the tunnel outer destination IP address is changed to an IP address that points to the new HAP corresponding to each user.

S407: Traffic of the roaming user is transferred between the new HAP and the FAP using a roaming tunnel.

Figure 7:
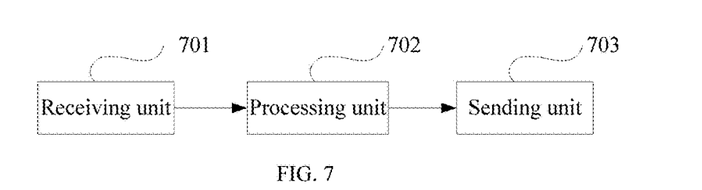
FIG. 7 is a schematic structural diagram of an access point AP according to an embodiment of the present disclosure.

As shown in FIG. 7, an embodiment of the present disclosure further provides an AP, where the AP is an FAP associated after layer 3 roaming of a wireless terminal of a user, the access point including: a receiving unit 701 configured to receive a first packet sent by the wireless terminal; a processing unit 702 configured to search, according to the first packet, for a pre-created user table to obtain an encapsulation entry of a first roaming tunnel on which the first packet is to be forwarded, where a tunnel outer destination IP address in the encapsulation entry of the first roaming tunnel is an IP address of a HAP before the roaming of the wireless terminal, and a tunnel outer source IP address in the encapsulation entry of the first roaming tunnel is an IP address of the FAP; and encapsulate the first packet according to the encapsulation entry of the first roaming tunnel; and a sending unit 703 configured to send the encapsulated first packet to the HAP using the first roaming tunnel.

Optionally, the receiving unit 701 is further configured to receive first user roaming information sent by a foreign access controller FAC to which the FAP belongs, where the first user roaming information includes user information about the user, information that the user is a layer 3 roaming user, and IP address information about the HAP.

Optionally, the processing unit 702 is further configured to add the encapsulation entry of the first roaming tunnel to the user table according to the first user roaming information.

Optionally, the HAP is an AP selected by an AC1 from an AP resource group, where the AC1 is an AC to which an AP1 associated before the roaming of the wireless terminal belongs, and the AP resource group consists of APs that belong to a same gateway device as the AP1.

Optionally, the receiving unit 701 is further configured to receive, using a second roaming tunnel, a second packet forwarded from the HAP to the wireless terminal, where the second packet is a packet that is received by the HAP from a network side and sent by the HAP to the wireless terminal, a tunnel outer destination IP address in an encapsulation entry of the second roaming tunnel is the IP address of the FAP, and a tunnel outer source IP address in the encapsulation entry of the second roaming tunnel is the IP address of the HAP.

Figure 8:
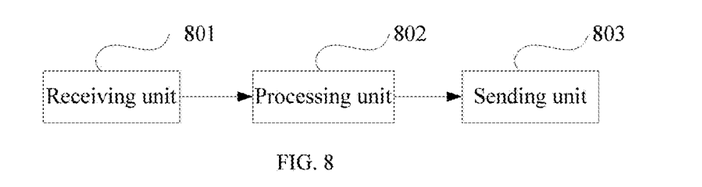
FIG. 8 is a schematic structural diagram of an access point AP according to an embodiment of the present disclosure.

As shown in FIG. 8, an embodiment of the present disclosure further provides an AP, where the AP is a HAP associated before layer 3 roaming of a wireless terminal of a user, the access point including: a receiving unit 801 configured to receive, using a first roaming tunnel, a first packet sent by a FAP associated after the layer 3 roaming of the wireless terminal, where a tunnel outer destination IP address in an encapsulation entry of the first roaming tunnel is an IP address of the HAP, and a tunnel outer source IP address in the encapsulation entry of the first roaming tunnel is an IP address of the FAP; a processing unit 802 configured to remove tunnel encapsulation from the first packet; and a sending unit 803 configured to send the first packet from which the tunnel encapsulation is removed to a gateway device to which the HAP belongs.

Optionally, the HAP is an AP selected by an AC1 from an AP resource group, where the AC1 is an AC to which an AP1 associated before the roaming of the wireless terminal belongs, and the AP resource group consists of APs that belong to a same gateway device as the AP1.

Optionally, the receiving unit 801 is further configured to receive, from a network side, a second packet sent to the wireless terminal; the processing unit 802 is further configured to encapsulate the second packet according to an encapsulation entry of a second roaming tunnel, where a tunnel outer destination IP address in the encapsulation entry of the second roaming tunnel is the IP address of the FAP, and a tunnel outer source IP address in the encapsulation entry of the second roaming tunnel is the IP address of the HAP; and the sending unit 803 is further configured to send the encapsulated second packet to the FAP using the second roaming tunnel.

Optionally, the receiving unit 801 is further configured to receive second user roaming information sent by the AC1 to which the HAP belongs, where the second user roaming information includes user information about the user, information that the user is a layer 3 roaming user, and IP address information about the FAP.

The processing unit 802 is further configured to create, according to the second user roaming information, a second user forwarding entry and the encapsulation entry of a second roaming tunnel corresponding to the second user forwarding entry.

Figure 9:
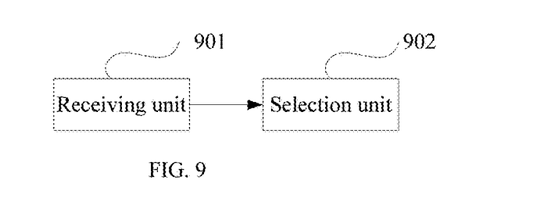
FIG. 9 is a schematic structural diagram of an access controller AC according to an embodiment of the present disclosure.

As shown in FIG. 9, this embodiment of the present disclosure further provides an AC, where the AC is a AC1 to which a first access point AP1 associated before layer 3 roaming of a wireless terminal of a user belongs, the access controller including: a receiving unit 901 configured to receive a notification message sent by a FAC to which a FAP associated after the layer 3 roaming of the wireless terminal belongs, where the notification message carries information that the user is a layer 3 roaming user; and a selection unit 902 configured to, after the receiving unit receives the notification message, select an AP from an AP resource group as a HAP of the wireless terminal, where the AP resource group consists of APs that belong to a same gateway device as the AP1.

Optionally, the selection unit 902 is specifically configured to dynamically select, according to the load balancing principle, an AP with minimum load as the HAP of the wireless terminal.

An embodiment of the present disclosure further provides a WLAN user roaming system, including the above-described two access points APs, and two access controllers ACs.

Figure 10:
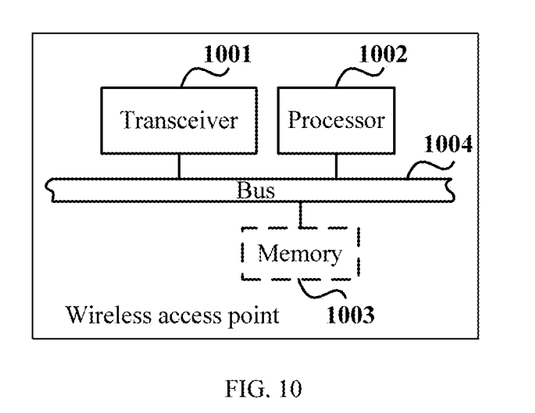
FIG. 10 is a schematic structural diagram of an access point AP according to an embodiment of the present disclosure.

An embodiment of the present disclosure further provides an AP, where the AP is a FAP associated after layer 3 roaming of a wireless terminal of a user. Referring to FIG. 10, the AP includes a transceiver 1001, a processor 1002, a memory 1003, and a bus 1004, where the transceiver 1001, the processor 1002, and the memory 1003 are connected and communicate with each other using the bus 1004.

The bus 1004 may be an industry standard architecture (ISA) bus, a peripheral component interconnect (PCI) bus, an extended industry standard architecture (EISA) bus, or the like. The bus 1004 may be classified into an address bus, a data bus, a control bus, and the like. For ease of indication, the bus is indicated by only one line, which does not mean that there is only one bus or one type of bus.

The transceiver 1001 may be an interface.

The memory 1003 is configured to store program code, where the program code includes an operation instruction. The memory 1003 may include a high-speed random access memory (RAM), or may include a non-volatile memory, for example, a magnetic disk storage.

The processor 1002 may be a central processing unit (CPU), or an application-specific integrated circuit (ASIC), or one or more integrated circuits configured to implement this embodiment of the present disclosure.

The transceiver 1001 is configured to receive a first packet sent by the wireless terminal.

The processor 1002 is configured to invoke the program code in the memory 1003, to execute the following operations: searching, according to the first packet, a pre-created user table to obtain an encapsulation entry of a first roaming tunnel on which the first packet is to be forwarded, where a tunnel outer destination IP address in the encapsulation entry of the first roaming tunnel is an IP address of a HAP before the roaming of the wireless terminal, and a tunnel outer source IP address in the encapsulation entry of the first roaming tunnel is an IP address of the FAP; and encapsulating the first packet according to the encapsulation entry of the first roaming tunnel.

The transceiver 1001 is further configured to send the encapsulated first packet to the HAP using the first roaming tunnel.

Figure 11:
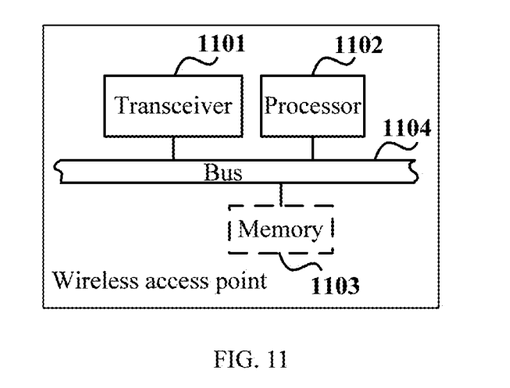
FIG. 11 is a schematic structural diagram of an access point AP according to an embodiment of the present disclosure.

As shown in FIG. 11, an embodiment of the present disclosure further provides an AP, where the AP is a HAP associated before layer 3 roaming of a wireless terminal of a user, the access point including: a transceiver 1101, a processor 1102, a memory 1103, and a bus 1104, where the transceiver 1101, the processor 1102, and the memory 1103 are connected and communicate with each other using the bus 1104.

The bus 1104 may be an ISA bus, a PCI bus, an EISA bus, or the like. The bus 1104 may be classified into an address bus, a data bus, a control bus, and the like. For ease of indication, the bus is indicated by only one line, which does not mean that there is only one bus or one type of bus.

The transceiver 1101 may be an interface.

The memory 1103 is configured to store program code, where the program code includes an operation instruction. The memory 1103 may include a high-speed RAM, or may include a non-volatile memory, for example, a magnetic disk storage.

The processor 1102 may be a CPU, or an ASIC, or one or more integrated circuits configured to implement this embodiment of the present disclosure.

The transceiver 1101 is configured to receive, using a first roaming tunnel, a first packet sent by a FAP associated after the layer 3 roaming of the wireless terminal, where a tunnel outer destination IP address in an encapsulation entry of the first roaming tunnel is an IP address of the HAP, and a tunnel outer source IP address in the encapsulation entry of the first roaming tunnel is an IP address of the FAP.

The processor 1102 is configured to invoke the program code in the memory 1103, to execute the following operation: removing tunnel encapsulation of the first packet.

The transceiver 1101 is further configured to send the first packet from which the tunnel encapsulation is removed to a gateway device to which the HAP belongs.

Figure 12:
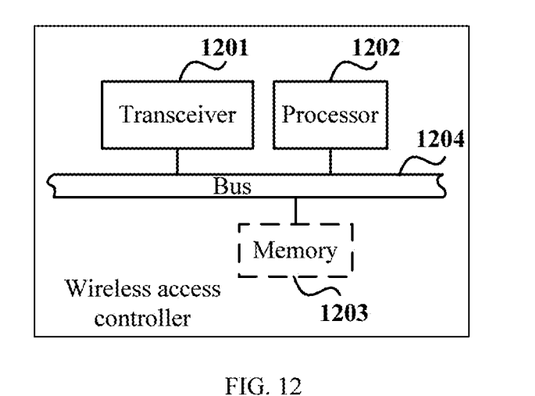
FIG. 12 is a schematic structural diagram of an access controller AC according to an embodiment of the present disclosure.

As shown in FIG. 12, an embodiment of the present disclosure further provides an AC, where the AC is a AC1 to which a AP1 associated before layer 3 roaming of a wireless terminal of a user belongs, the access controller including: a transceiver 1201, a processor 1202, a memory 1203, and a bus 1204, where the transceiver 1201, the processor 1202, and the memory 1203 are connected and communicate with each other using the bus 1204.

The bus 1204 may be an ISA bus, a PCI bus, an EISA bus, or the like. The bus 1204 may be classified into an address bus, a data bus, a control bus, and the like. For ease of indication, the bus is indicated by only one line, which does not mean that there is only one bus or one type of bus.

The transceiver 1201 may be an interface.

The memory 1203 is configured to store program code, where the program code includes an operation instruction. The memory 1203 may include a high-speed RAM, or may include a non-volatile memory, for example, a magnetic disk storage.

The processor 1202 may be a CPU, or an ASIC, or one or more integrated circuits configured to implement this embodiment of the present disclosure.

The transceiver 1201 is configured to receive a notification message sent by a FAC to which a FAP associated after the layer 3 roaming of the wireless terminal belongs, where the notification message carries information that the user is a layer 3 roaming user.

The processor 1202 is configured to invoke the program code in the memory 1203, to execute the following operation: after the receiving unit receives the notification message, selecting one AP from an AP resource group as a HAP of the wireless terminal, where the AP resource group consists of APs that belong to a same gateway device as the AP1.

The functional implementation of the apparatus in this embodiment of the present disclosure is based on the same conception as the method, reference may be made to the method, and details are not repeatedly described herein.

According to the WLAN user roaming method provided by this embodiment of the present disclosure, in most campus network scenarios, since a user can roam between APs, a distance between these APs is generally not excessively long; therefore, directly establishing a tunnel between the APs can greatly shorten a forwarding path of the roaming tunnel, which is obviously beneficial to the improvement of the forwarding efficiency and shortens an establishing time of the roaming tunnel, thereby shortening a user service interruption time during the roaming process.

A person of ordinary skill in the art may be aware that, in combination with the examples described in the embodiments disclosed in this specification, modules and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual requirements to achieve the objectives of the solutions of the embodiments.

In addition, functional modules in the embodiments of the present disclosure may be integrated into one processing module, or each of the modules may exist alone physically, or two or more modules are integrated into one module.

When the functions are implemented in the form of a software functional module and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wireless local area network (WLAN) user roaming method, comprising:
   receiving, by a foreign access point (FAP) associated after layer 3 roaming of a wireless terminal of a user, a first packet sent by the wireless terminal;
   receiving, by the FAP, first user roaming information from a foreign access controller (FAC) to which the FAP belongs when the FAC detects that a service virtual local area network (VLAN) joined by the FAP and a first access point (APl) are different, the first user roaming information comprising user information about the user, information that the user is a layer 3 roaming user, and an Internet Protocol (IP) address of a home access point (HAP);
   adding, by the FAP, an encapsulation entry of a first roaming tunnel to a user table according to the first user roaming information, a tunnel outer destination IP address in the encapsulation entry of the first roaming tunnel being the IP address of the HAP before the roaming of the wireless terminal, and a tunnel outer source IP address in the encapsulation entry of the first roaming tunnel being an IP address of the FAP:
   searching, by the FAP according to the first packet, the user table to obtain the encapsulation entry of the first roaming tunnel on which the first packet is to be forwarded;
   encapsulating, by the FAP, the first packet according to the encapsulation entry of the first roaming tunnel established directly between the FAP and the HAP; and
   sending, by the FAP, the encapsulated first packet to the HAP using the first roaming tunnel, the HAP being an AP selected by a first access controller (AC1) from an AP resource group based on load balancing, the AC1 is an access controller (AC) to which the AP1 belongs, the AP resource group comprising APs that belong to a same gateway device as the AP1, the selected HAP not being the AP1, and the AP1 was associated with the wireless terminal before the roaming of the wireless terminal.

2. The method of claim 1, wherein the method further comprises receiving, by the FAP using a second roaming tunnel, a second packet forwarded from the HAP to the wireless terminal, the second packet being a packet that is received by the HAP from a network side and sent by the HAP to the wireless terminal, a tunnel outer destination IP address in an encapsulation entry of the second roaming tunnel being the IP address of the FAP, and a tunnel outer source IP address in the encapsulation entry of the second roaming tunnel being the IP address of the HAP.

3. The method of claim 1, wherein the HAP comprises the AP with a minimum number of users in the AP resource group.

4. An access point (AP), the AP being a foreign access point (FAP) associated after layer 3 roaming of a wireless terminal of a user, the access point comprising:
   a receiver configured to receive a first packet sent by the wireless terminal and to receive first user roaming information from a foreign access controller (FAC) to which the FAP belongs when the FAC detects that a service virtual local area network (VLAN) coupled by the FAP and a first access, point (AP1) are different, the first user roaming information comprising user information about the user, information that the user is a layer 3 roaming user, and an Internet Protocol (IP) address of a home access point (HAP):
a processor coupled to the receiver and configured to;
add an encapsulation entry of a first roaming tunnel to a user table according to the first user roaming information, a tunnel outer destination IP address in the encapsulation entry of the first roaming tunnel being the IP address of the HAP before the roaming of the wireless terminal, and a tunnel outer source IP address in the encapsulation entry of the first roaming tunnel being an IP address of the FAP;
search, according to the first packet, for the user table to obtain the encapsulation entry of the first roaming tunnel on which the first packet is to be forwarded; and
encapsulate the first packet according to the encapsulation entry of the first roaming tunnel established directly between the FAP and the HAP; and
a transmitter coupled to the processor and configured to send the encapsulated first packet to the HAP using the first roaming tunnel, the HAP being an AP selected by a first access controller (AC1) from an AP resource group based on load balancing, the AC1 being an access controller (AC) to which the AP1 belongs, the AP resource group comprising APs that belong to a same gateway device as the AP1, the selected HAP not being the AP1, and the AP1 was associated with the wireless terminal before the roaming of the wireless terminal.

5. The AP of claim 4, wherein the receiver is further configured to receive, using a second roaming tunnel, a second packet forwarded from the HAP to the wireless terminal, the second packet being a packet that is received by the HAP from a network side and from the HAP to the wireless terminal, a tunnel outer destination IP address in an encapsulation entry of the second roaming tunnel being the IP address of the FAP, and a tunnel outer source IP address in the encapsulation entry of the second roaming tunnel being the IP address of the HAP.

6. The AP of claim 4, wherein the HAP comprises the AP with a minimum number of users in the AP resource group.

7. An access controller (AC), the AC being a first access controller (AC1) to which a first access point (AP1) associated before layer 3 roaming of a wireless terminal of a user belongs, the access controller comprising:
a receiver configured to receive a notification message from a foreign access controller (FAC) to which a foreign access point (FAP) associated when the FAC detects that a service virtual local area network (VLAN) coupled by the FAP and the APT are different, the notification message carrying information that the user is a layer 3 roaming user; and
a processor coupled to the receiver and configured to select an access point (AP) from an AP resource group as a home access point (HAP) of the wireless terminal based on load balancing after the receiver receives the notification message, the AP resource group comprising APs that belong to a same gateway device as the AP1, the selected HAP not being the AP1, the AP1 was associated with the wireless terminal before the roaming of the wireless terminal, the FAP encapsulating a first packet according to an encapsulation entry of a first roaming tunnel established directly between the FAP and the HAP and sending, by the FAP, the encapsulated first packet to the HAP using the first roaming tunnel.

8. The AC of claim 7, wherein the processor is further configured to dynamically select, according to the load balancing principle, an AP with minimum load as the HAP of the wireless terminal.

9. The AC of claim 7, wherein the HAP comprises the AP with a minimum number of users in the AP resource group.

* * * * *

UNITED STATES PATENT AND TRADEMARK OFFICE
CERTIFICATE OF CORRECTION

PATENT NO. : 10,104,040 B2
APPLICATION NO. : 14/955551
DATED : October 16, 2018
INVENTOR(S) : Yunyun Lin et al.

Page 1 of 1

It is certified that error appears in the above-identified patent and that said Letters Patent is hereby corrected as shown below:

On the Title Page

Item (30), Line 1: "201410717923" should read "201410717923.9"

In the Claims

Column 18, Line 13: "APT" should read "AP1"

Signed and Sealed this
Twentieth Day of November, 2018

Andrei Iancu
*Director of the United States Patent and Trademark Office*